United States Patent [19]

Long

[11] Patent Number: 4,986,950
[45] Date of Patent: Jan. 22, 1991

[54] METHOD OF FORMING POLYCARBONATE SHEETING

[75] Inventor: Graham Long, South Coogee, Australia

[73] Assignee: Precision Roofing Accessories Co. Pty., West Ryde, Australia

[21] Appl. No.: 305,276

[22] Filed: Feb. 1, 1989

[51] Int. Cl.$^5$ .................. B29C 53/04; B29D 25/00; B29K 69/00

[52] U.S. Cl. .................. 264/310; 264/285; 264/295; 264/296; 264/292; 264/322; 264/339; 264/DIG. 65; 264/DIG. 66; 425/384; 425/391

[58] Field of Search .............. 264/230, 295, 310, 339, 264/235, 346, 285–287, 322, 291, 292, 544, 296, DIG. 65, DIG. 66; 425/391, 384, 397, DIG. 48, 472

[56] References Cited

U.S. PATENT DOCUMENTS

| | | | |
|---|---|---|---|
| 2,517,701 | 8/1950 | Oettinger, Jr. | 264/339 |
| 2,647,284 | 8/1953 | Richardson et al. | 264/339 |
| 3,020,596 | 2/1962 | Clapp et al. | 264/322 |
| 3,041,668 | 7/1962 | Bonza et al. | 264/322 |
| 3,426,115 | 2/1969 | Taber | 264/339 |
| 3,499,072 | 3/1970 | Helling et al. | 264/339 |
| 3,599,959 | 8/1971 | Asenbauer | 425/472 |
| 3,632,275 | 1/1972 | Misner | 264/554 |
| 3,894,137 | 7/1975 | Moench | 264/230 |
| 3,988,399 | 10/1976 | Evans | 264/230 |
| 4,352,776 | 10/1982 | Weisner et al. | 264/292 |

FOREIGN PATENT DOCUMENTS

| | | | |
|---|---|---|---|
| 2821884 | 11/1978 | Fed. Rep. of Germany | 264/310 |
| 47-16079 | 5/1972 | Japan | 264/339 |
| 55-49220 | 4/1980 | Japan | 264/310 |
| 311764 | 8/1971 | U.S.S.R. | 264/285 |
| 827306 | 5/1981 | U.S.S.R. | 264/339 |

*Primary Examiner*—Jeffery Thurlow
*Assistant Examiner*—Mathieu Vargot
*Attorney, Agent, or Firm*—Ladas & Parry

[57] ABSTRACT

The invention relates to a method for forming twin-wall polycarbonate sheets into desired arcuate forms to be used, for example, as awnings. The method is distinguished from known forming techniques which are generally not effective in forming the polycarbonate sheets hereinafter described.

The method generally includes preheating a portion of the polycarbonate sheet within a heating chamber, engaging the sheet with the mould which is pivotally mounted to the frame of an apparatus within the heating chamber, frictionally restraining the movement of the sheet with respect to the frame at a position spaced from the mould, and outside the heating chamber, and pivoting the mould so as to form the sheet.

The present invention generally overcomes the difficulties in forming twin-walled polycarbonate sheets thereby allowing this material to be used in place of other conventional awning materials such as fibreglass and corrugated iron.

8 Claims, 4 Drawing Sheets

METHOD OF FORMING POLYCARBONATE SHEETING

The present invention relates to the moulding of plastic composite sheets, and in particular to the forming of a polycarbonate sheet into barrel vaults and bull nozes.

BACKGROUND OF THE INVENTION

Twin walled polycarbonate sheeting which has a plurality of spacing webs between the walls is relatively new in the moulding industry. Due to its lightweight, and excellent light transmission and insulating properties it makes it very useful in the roofing industry, as well as other industries. Until recently the moulding of such materials has not been possible with conventional moulding apparatus due to the temperature differential resulting on the walls and the cracks and bubbles appearing on the surfaces of the moulded sheet. Unfortunately, whereas simply moulding of flat sheets has now been achieved, the moulding of an arcuate configuration, such as a barrel vault or bull noze as commonly known, in the industry has not yet been possible.

It is therefore an object of the present invention to overcome or substantially ameliorate this disadvantage.

SUMMARY OF THE INVENTION

In accordance with one broad form of the present invention there is disclosed a method of forming at least a portion of a sheet into a generally arcuate configuration, said method comprising the steps:

heating said portion of the sheet in a heating chamber to a forming temperature prior to forming, and also heating a mould member mounted within the heating chamber to said forming temperature;

said mould member comprising an external shell having said arcuate configuration, and which is filled with a foam material adapted to generally minimise heat loss from the mould;

moving a leading edge of said portion from an initial position spaced from the mould to be in contact with and secured to said mould member;

rotating said mould member so as to progressively move said sheet through said chamber and to form said portion of the sheet against the mould member.

Preferably upon forming of the sheet taking place, cooling air is directed onto the sheet. Further, the progression of said sheet is preferably hindered by a friction clamping means located forward of the mould member so as to tension the sheet and promote the forming process.

A second broad form of the present invention provides an apparatus for moulding a polycarbonate sheet into a generally arcuate configuration, comprising a heating chamber, guide means to hold the sheet in a predetermined position spaced from a mould member and outside said heating chamber, said mould member having a predetermined arcuate mould surface and being pivotably mounted within said chamber, further comprising locating means to secure a leading edge of said sheet onto said mould, and means to rotate said mould in a predetermined direction so as to pull the sheet through said guide means;

and wherein said mould member is adapted to generally maintain an elevated temperature with minimal heat loss.

Preferably, the mould is manufactured from stainless steel formed to the shape required and filled with polyurethane foam which retains heat. Also, it is preferable that the heating be by menas of heating elements above the sheet and/or fast heating quartz elements to the side, and that the apparatus further comprises a friction clamping means frictionally to resist the progression of said sheet through said apparatus.

When forming a bull noze (i.e. a quarter circle on the end of a sheet), the heating frame length is preferably approximately 200 mm plus the length of the arc. Similarly, a barrel vault i.e. a semi-circle on the end of a sheet, requires the heating frame length to be approximately 200 mm plus the length of the semi-circle. However, it should be appreciated that these dimensions are determined by the sensitivity of the polycarbonate sheet used and may vary from substance to substance.

BRIEF DESCRIPTION OF THE DRAWINGS

A preferred embodiment of the present invention will now be described, by way of example only, with reference to the accompanying drawings in which.

DETAILED DESCRIPTION

Figure 1:
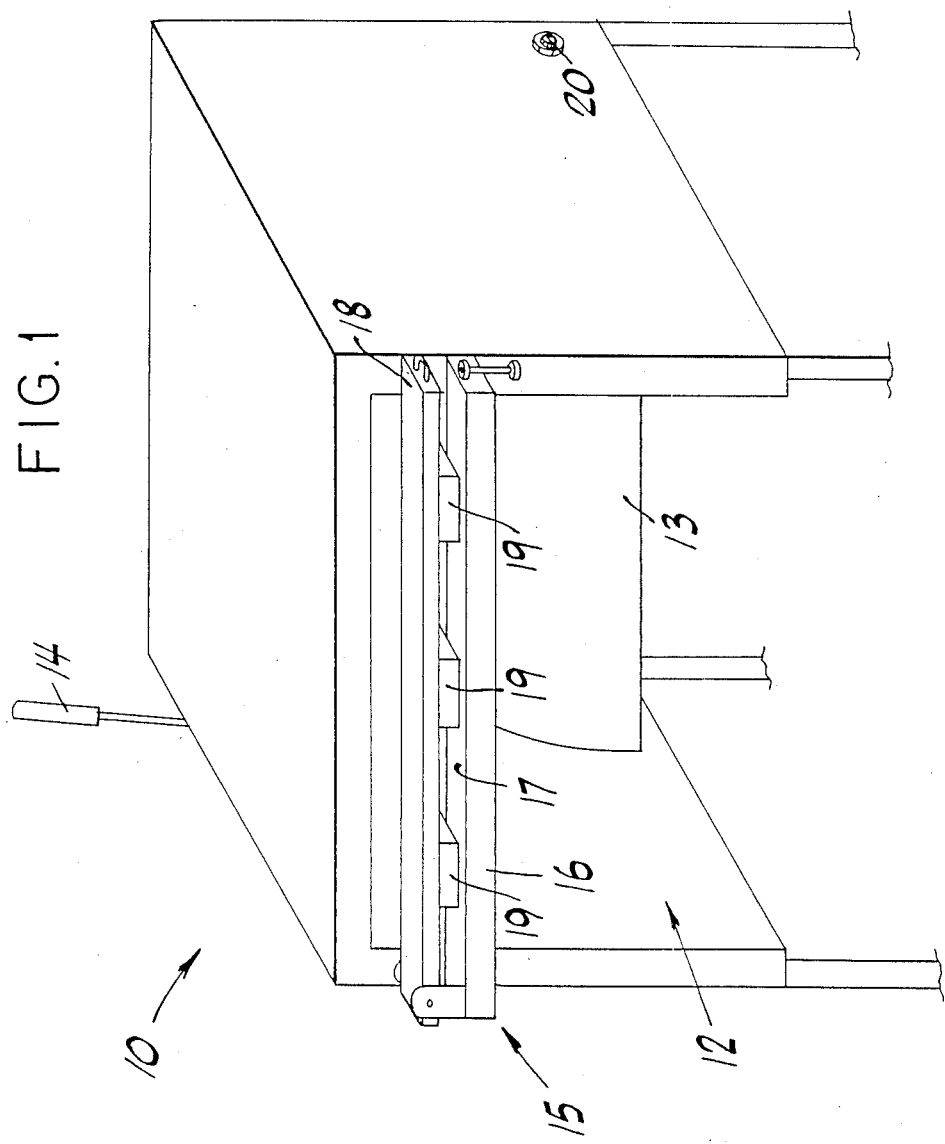
FIG. 1 is a perspective view of one embodiment of the apparatus of the present invention.

There is depicted an apparatus 10 for forming an arcuate section on the end of a polycarbonate sheet 11. The apparatus 10 comprises a heating chamber 12 and a mould 13. The mould 13 is removable from the chamber 12 so that any one of a number of desired moulds can be used in the apparatus. The mould 13 is mounted on an axle 20 so as to be pivotable, with a handle 14 being attached to the axle 20 for manually rotating the mould 13.

The mould 13 comprises a stainless steel outer shell 21 filled with a polyurethane foam 22. The outer shell 21 defines a mould surface 23 which is generally arcuate and consistent with the desired curvature of the sheet 11.

Figure 2:
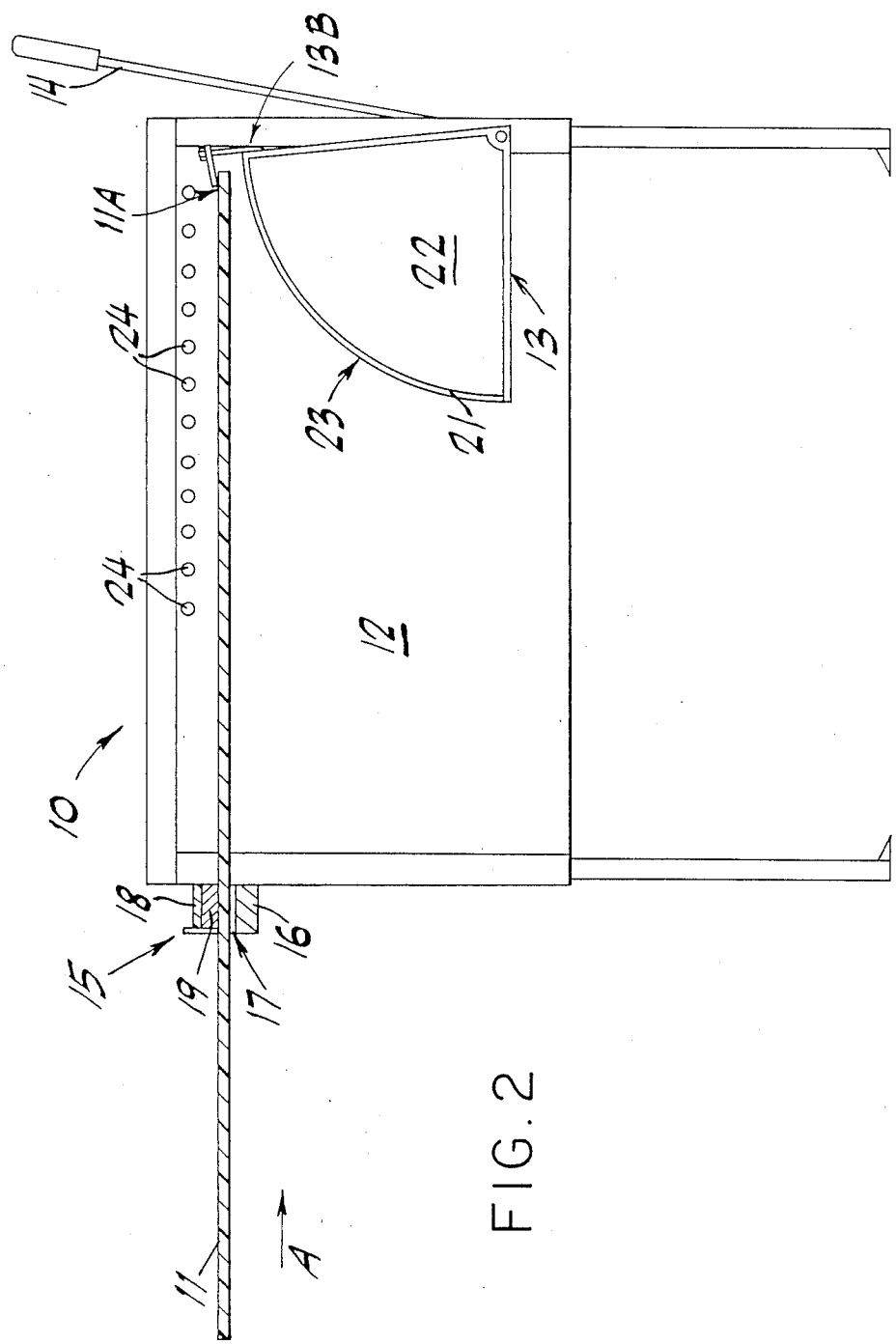
FIG. 2 is a side elevation cross sectional view of the embodiment of FIG. 1.
Figure 3:
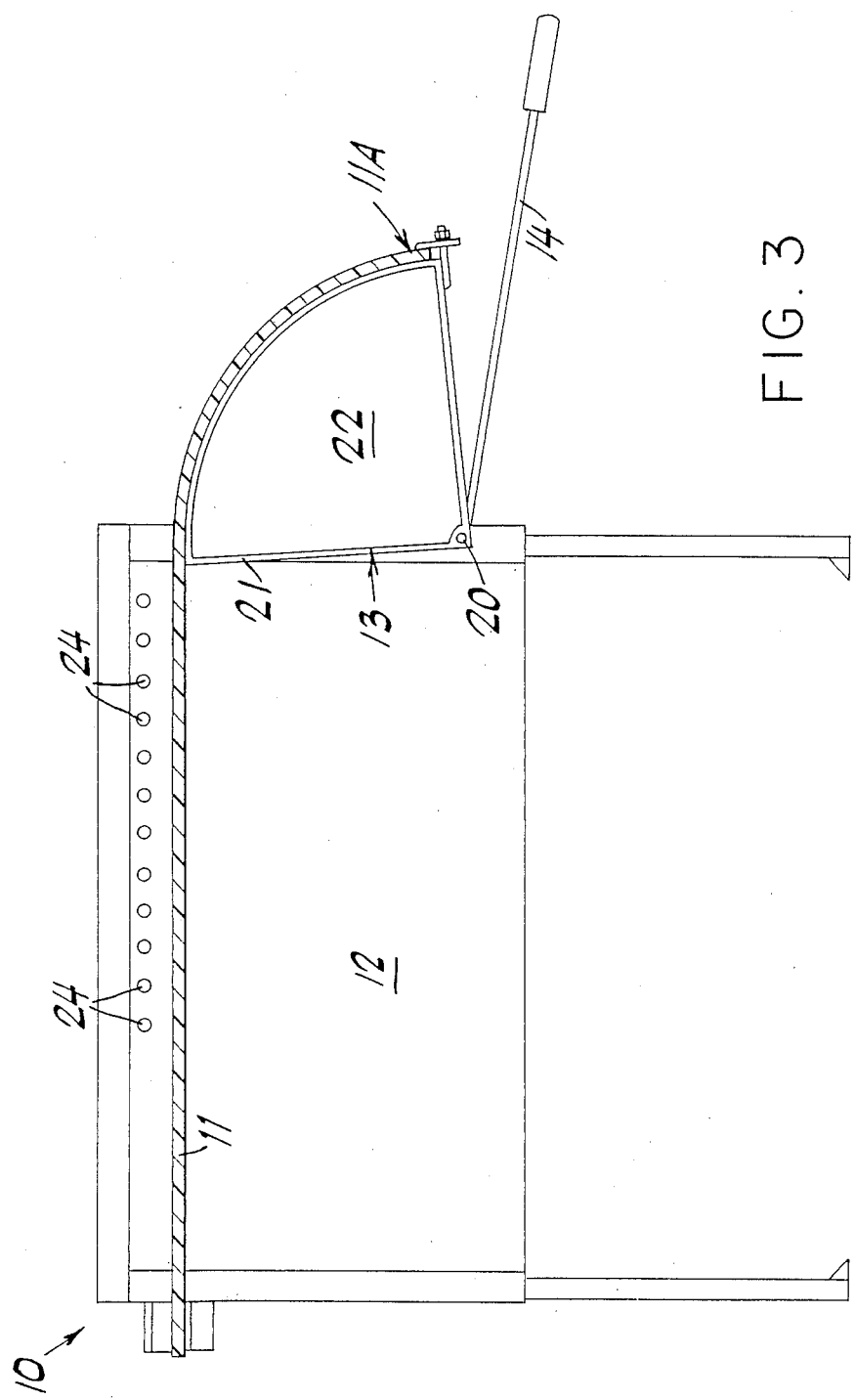
FIG. 3 is a side elevation cross sectional view of the apparatus of FIG. 1 showing the polycarbonate sheet after being formed.
Figure 4:
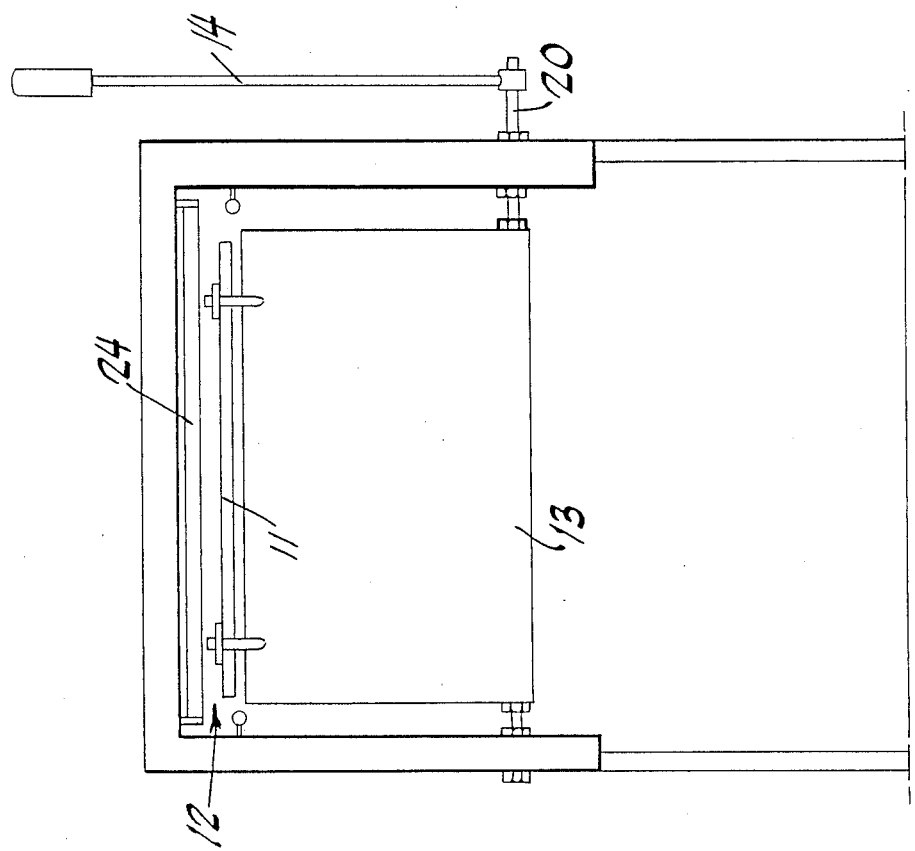
FIG. 4 is an end elevation of the apparatus of FIG. 1.

As best seen in FIGS. 1, 2 and 3, the sheet 11 is fed into the heating apparatus 12 in the direction indicated by arrow A. When a length of the sheet 11 is within the heating chamber 12, a predetermined portion of the sheet 11 is heated to a predetermined temperature suitable for moulding the sheet 11 (also called "the forming temperature") by means of top heating elements and side fast heating quartz elements. The top elements are 1 kw and are arranged in three banks of four, each element being parallel and extending normal to the direction of arrow "A", and are spaced approximately 100 mm. apart.

When the sheet 11 is at the predetermined or forming temperature, the heating elements are turned off and the sheet 11 is then brought into contact with the mould 13 from which it had previously been isolated. The leading edge 11A of the sheet 11 is attached to the leading portion 13B of the mould 13, and at a position distanced from the leading edge, the sheet 11 is clamped in a clamping means 15 so as to frictionally engage the sheet 11 and create a resistance to movement, by means of a predetermined friction, of the sheet 11 through the apparatus 10.

The clamping means 15 comprises a base frame 16 having a support surface 17. Pivotably mounted to the base frame 16 is an engaging member 18 having a plurality of blocks 19. The engaging member 18 is movable between an open position wherein the sheet 11 can freely pass through the frame 16, and a clamping position wherein said blocks 19 and support surface 17 are caused to exert a predetermined force on the sheet 11. The support surface 17 and the blocks 19 are made from a nylon material having a known friction coefficient whereby the clamping force exerted thereby is predetermined so as to create the desired frictional resistance to movement of the sheet 11. The desired frictional resistance will allow the sheet to slide through the clamping means provided a sufficient pulling force is exerted on the sheet 11. By rotating the mould 13 by means of the handle 14, the pulling force exerted thereby on the sheet 11 overcomes the frictional resistance. In this way, the sheet 11 is tensioned so as to assist in the moulding thereof about the mould surface 23.

To form the arcuate portion, i.e. either a bull noze or a barrel vault, the mould 13 is rotated by way of the handle 14 and the heated sheet 11 takes the form of the mould surface 23. This is preferably done in the absence of heat and in the presence of air cooling. In this manner a smooth finish is allowed to form on the sheet.

It should be appreciated that the length of the arcuate portion, plus at least 200 mm is usually required for the ultimate length of the sheet 11.

Different shapes and sizes of formed sheet 11 can be achieved by increasing or decreasing the number of heating elements used in the heating chamber, and by using different moulds 13.

The foregoing describes only one embodiment, and modifications obvious to those skilled in the art, can be made thereto without departing from the scope of the present invention. For example, the dimensions used are for a twin walled polycarbonate sheeting, commonly known as Danpalon (registered trade mark), and any other materials used therein with similar properties may require a different length etc. Also, wherein the means by rotating the mould has been disclosed as a handle mounted on the side of the mould, a fully automatic means can also be utilized.

The mould can also be corrugated in order to form a corrugated sheeting as commonly used in roofing.

What I claim is:

1. A method of forming at least a portion of a twin walled sheet into a generally arcuate configuration, said method comprising:
   heating said portion of the sheet in a heating chamber to a forming temperature prior to forming, and also heating a mould member mounted within the heating chamber to said forming temperature;
   said mould member comprising an external shell having said arcuate configuration;
   moving a leading edge of said portion from an initial position spaced from the mould member to be in contact with and secured to said mould member;
   rotating said mould member to progressively move said sheet through said chamber and to form said portion of the sheet against the mould member and cooling said sheet as it is removed from the chamber.

2. The method of claim 1 wherein said mould member is filled with a foam material adapted to generally minimize heat loss from the mould member.

3. The method of claim 2 wherein said heating of said sheet is discontinued prior to the rotating of said mould member, and wherein the rotating of said mould member causes the portion of the sheet formed against the mould member to pass from the heating chamber with the portion of the sheet formed against the mould member still in contact with said mould member, the method further comprising subjecting the portion of the sheet which passes from the heating chamber to cooling air as it passes from the chamber.

4. The method of claim 3 wherein said sheet is tensioned between said leading edge and a position of the sheet which is spaced from said heated portion.

5. The method of claim 4 wherein said tensioning is caused by applying a predetermined friction force at said position with a frictional clamping means, and then rotating said mould member so as to pull said leading edge away from, and thereby move said sheet through, said clamping means.

6. The method of claim 1 wherein said sheet is a polycarbonate sheet.

7. The method of claim 6 wherein said sheet is tensioned between said leading edge and a position of the sheet which is spaced from said heated portion.

8. The method of claim 7 wherein said tensioning is caused by applying a predetermined friction force at said position with a frictional clamping means, and then rotating said mould member so as to pull said leading edge away from, and thereby move said sheet through, said clamping means.

* * * * *